United States Patent [19]
Cheung et al.

[11] Patent Number: 5,605,346
[45] Date of Patent: Feb. 25, 1997

[54] SIDE MOUNTED AIR BAG MODULE

[75] Inventors: Bonnie Y. Cheung, Auburn Hills; Brian H. Frantz, Royal Oak; Kenneth H. Desaele, Romeo; Timothy W. Hill, Troy; Jeffrey A. Welch, Saint Clair Shores, all of Mich.

[73] Assignee: General Motors Corporation, Detroit, Mich.

[21] Appl. No.: 520,532

[22] Filed: Aug. 28, 1995

[51] Int. Cl.⁶ .............................. B60R 21/22; B60R 21/26
[52] U.S. Cl. ...................................... 280/728.2; 280/703.2; 280/736; 280/743.1
[58] Field of Search ................ 280/730.2, 730.1, 280/728.1, 728.2, 743.1, 740, 736, 755

[56] References Cited

U.S. PATENT DOCUMENTS

| | | | |
|---|---|---|---|
| 2,806,737 | 9/1957 | Maxwell | 280/730.1 |
| 2,834,606 | 5/1958 | Bertrand | 280/730.1 |
| 3,774,936 | 11/1973 | Barnett et al. | 280/730.1 |
| 3,897,961 | 8/1975 | Leising et al. | 280/730.1 |
| 4,298,214 | 11/1981 | Brown, Jr. | 280/741 |
| 4,536,008 | 8/1985 | Brown, Jr. | 280/730.1 |
| 5,265,903 | 11/1993 | Kuretake et al. | 280/730.2 |
| 5,322,322 | 6/1994 | Bark et al. | 280/730.2 |
| 5,333,898 | 8/1994 | Stutz | 280/730.2 |
| 5,333,899 | 8/1994 | Witte | 280/730.2 |
| 5,462,308 | 10/1995 | Seki et al. | 280/730.2 |

*Primary Examiner*—Brian L. Johnson
*Assistant Examiner*—Peter C. English
*Attorney, Agent, or Firm*—Kathryn A. Marra

[57] ABSTRACT

An air bag module for a vehicle includes an inflator for discharging inflator gas and an air bat; for inflation by the discharging inflator gas. The air bag has a fixed edge adapted to be fixedly connected to the vehicle and also has a sliding edge adapted to be slidably connected to the vehicle. Upon air bag deployment, the sliding edge of the air bag slides along the vehicle and extends the air bag to the inflated condition. The air bag module preferably includes a conduit having a first portion in fluid communication with the inflator for receiving the discharging inflator gas therein. The conduit also includes a second portion spaced apart from the inflator and having an opening in fluid communication with the air bag for directing inflator gas into the air bag. The second portion of the conduit directs the discharging inflator gas such that the sliding edge of the air bag is forced to the extended condition. Advantageously, the conduit allows the inflator to be spaced apart from the air bag for easier packaging of the air bag module in the vehicle. Further packaging advantages are preferably gained by slidably connecting the sliding edge of the air bag to the same conduit which transmits the inflator gas from the inflator to the air bag.

12 Claims, 5 Drawing Sheets

SIDE MOUNTED AIR BAG MODULE

This invention relates to a vehicle air bag module, and more particularly to an air bag module which is easily mounted in the side structure of a vehicle.

BACKGROUND OF THE INVENTION

It is well known in motor vehicles to provide an air bag module for protecting a vehicle occupant. It is also known to provide an air bag module including an air bag and an inflator for generating gas to inflate the air bag upon sensing predetermined vehicle conditions. It is also known to provide an air bag module for lateral protection of the head and upper body of a vehicle occupant.

For example, the prior art has disclosed an air bag module for protecting the head of the occupant which includes a housing mounted at the corner of a side window in a vehicle. An air bag and an inflator for inflating the air bag are stored in a folded condition within the housing. Upon air bag deployment, two lateral edges of the air bag run along two guide elements mounted to the vehicle to partially cover the side window, thus providing partial lateral protection to a vehicle occupant.

The prior art modules have the shortcoming of being cumbersome and difficult to package in the limited space available in the side structure of the vehicle. For example, the housing which holds the inflator and the entire folded air bag either takes up a significant amount of room in one localized position or severely limits the size of the inflator and air bag that can be deployed for lateral protection. In addition, these assemblies also require packaging of extra parts, such as guide elements, special tracks, or cables, within the side structure of the vehicle. Due to design and styling considerations, there is often not sufficient space available to mount either the inflator or the inflator and air bag in the upper side roof rail area of the vehicle.

SUMMARY OF THE INVENTION

This invention solves the shortcomings of the prior art by providing an air bag module which is easily packaged in the limited space available in the side structure of the vehicle while providing lateral protection to the head and upper body of a vehicle occupant. An air bag of the air bag module is attached to the vehicle in a manner which is particularly well-adapted for ease of deployment. Advantageously, a preferred form of the present invention also allows the inflator to be remote from the air bag and uses certain components for dual purposes such that packaging of the air bag module can be accomplished in a slim vehicle side structure.

These advantages are accomplished in the present invention by providing an air bag module for a vehicle including an inflator for discharging inflator gas and an air bag for inflation by the discharging inflator gas. The air bag has a fixed edge adapted to be fixedly connected to the vehicle and also has a sliding edge adapted to be slidably connected to the vehicle. Upon air bag deployment, the sliding edge of the air bag slides along the vehicle and extends the air bag to the inflated condition. Preferably, the fixed edge of the air bag is fully extended prior to air bag inflation. This advantageously facilitates quick deployment of the air bag as well as facilitates packaging the air bag. Accordingly, the air bag preferably has a stored condition in which the air bag including the sliding edge is folded substantially adjacent the fixed edge of the air bag.

In accordance with another aspect of this invention, the air bag preferably has a folded condition prior to air bag inflation and an extended condition upon air bag inflation. The air bag module includes a conduit having a first portion in fluid communication with the inflator for receiving the discharging inflator gas therein. The conduit also includes a second portion spaced apart from the inflator and having an opening in fluid communication with the air bag for directing inflator gas into the air bag. The second portion of the conduit directs the discharging inflator gas such that the sliding edge of the air bag is forced to the extended condition. Advantageously, the conduit allows the inflator to be spaced apart from the air bag for easier packaging of the air bag module in the vehicle. Further packaging advantages are preferably gained by slidably connecting the sliding edge of the air bag to the same conduit which transmits the inflator gas from the inflator to the air bag. Thus, upon air bag deployment, the sliding edge of the air bag slides along the conduit between the first portion and the second portion. Advantageously, the conduit is used as a guide device such that the need for a separate guide device is eliminated.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
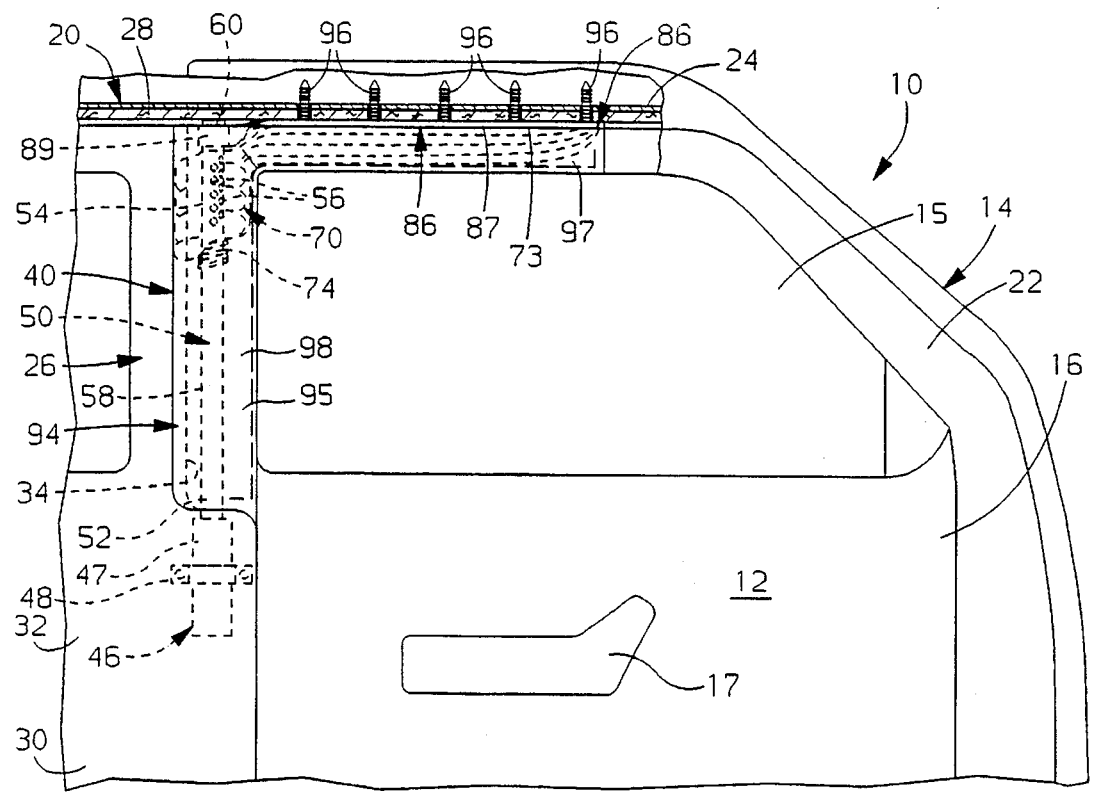
FIG. 1 is a side view of a vehicle interior partially broken away and showing a section through a roof rail and showing an undeployed air bag module including the air bag in the deflated condition.

Referring to FIG. 1, it is seen that a vehicle 10 includes a vehicle interior 12 having a door 14 including a movable window 15 mounted thereon. The door 14 also includes an inner door panel 16 with an armrest 17 disposed thereon. The vehicle 10 includes underlying supportive vehicle side structure 20 preferably made of appropriately formed and joined sheet metal. The vehicle side structure 20 includes a rearwardly canted front side pillar portion hereinafter referred to as an A-pillar 22, a generally horizontally extending side roof rail 24, and a generally vertically extending middle side pillar portion hereinafter referred to as a B-pillar 26. A headliner 28 is mounted adjacent the roof rail 24 of the vehicle 10 facing the vehicle interior 12. The vehicle side structure 20 may also include suitable seals 21 between the vehicle side structure 20 and the door 14 of the vehicle 10. The B-pillar 26 includes a lower portion 30 which is covered by a conventional B-pillar interior trim panel 32. The vehicle interior 12 includes an L-shaped recess 34 adjacent the upper B-pillar 26 and roof rail 24. The L-shaped recess 34 is not covered by conventional trim, but instead is adapted to mount an air bag module 40, as described further hereinafter.

Referring to FIG. 1, an air bag module 40 according to the present invention is shown in the undeployed condition and is preferably mounted in the L-shaped recess 34. The air bag module 40 includes the component parts of an inflator 46, a conduit 50, a mounting bracket 86, an air bag 70, and an air bag housing 94 having integral housing fasteners 96.

The inflator 46 may be of any conventional construction which contains chemicals for igniting to generate gas for discharge upon the sensing of predetermined vehicle 10 conditions. The inflator 46 preferably discharges inflator gas out through a suitable opening on an upper axial end 47 of the inflator 46. To assure that the inflator 46 is solidly anchored to the vehicle 10 during discharge of inflator gases, the inflator 46 is preferably mounted directly to the vehicle side structure 20 at the B-pillar 26 such as by a suitable inflator bracket 48 shown in FIGS. 1, 2 and 7. The inflator 46 is preferably mounted remote from the folded air bag 70, such as on the lower portion 30 of the B-pillar 26 and under the conventional B-pillar interior trim panel 32. Thus, the inflator 46 advantageously does not occupy limited packaging space in the upper portion of the vehicle side structure 20 needed to store the air bag 70.

The conduit 50 is preferably an elongate hollow metal tube having a smooth outer surface, but it will be appreciated that the conduit 50 may also be made of plastic, fabric or other materials capable of transporting inflator gas. The conduit 50 has a lower first portion 52 connected to the inflator 46 and in fluid communication with the inflator 46 for receiving discharging inflator gas therein. The conduit 50 has an upper second portion 54 which is spaced apart from both the inflator 46 and the first portion 52. The second portion 54 is in fluid communication with the air bag 70 and includes a plurality of conduit openings 56 for directing the discharging inflator gas into the air bag 70. The conduit 50 includes a guide portion 58 extending between the first portion 52 and the second portion 54. An uppermost end 60 of the conduit 50 adjacent the second portion 54 is suitably closed, such as by a welded-on cap 62, such that inflator gas does not escape out through the uppermost end 60 of the conduit 50. It will be appreciated that the cap 62 is necessary only when the uppermost end 60 is not being used as a conduit opening for discharging the inflator gas into the air bag 70. The conduit 50 serves the dual purpose of routing inflator gas from a remote inflator 46 to the air bag 70 and also serves as a guide for a sliding edge 74 of the deploying air bag 70, as described further hereinafter. Thus, this dual-function conduit 50 greatly enhances the packaging of the air bag module 40.

Figure 2:
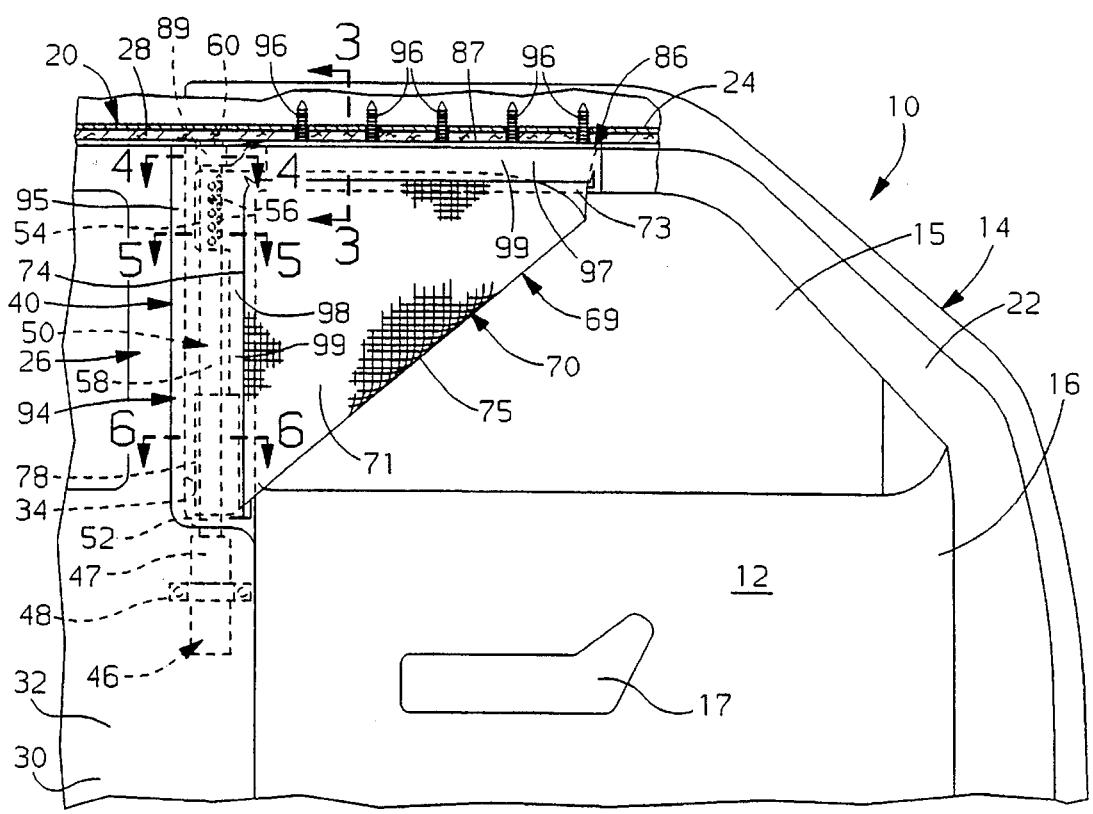
FIG. 2 is a view similar to FIG. 1, but showing the deployed air bag module including an air bag in the inflated condition.
Figure 3:
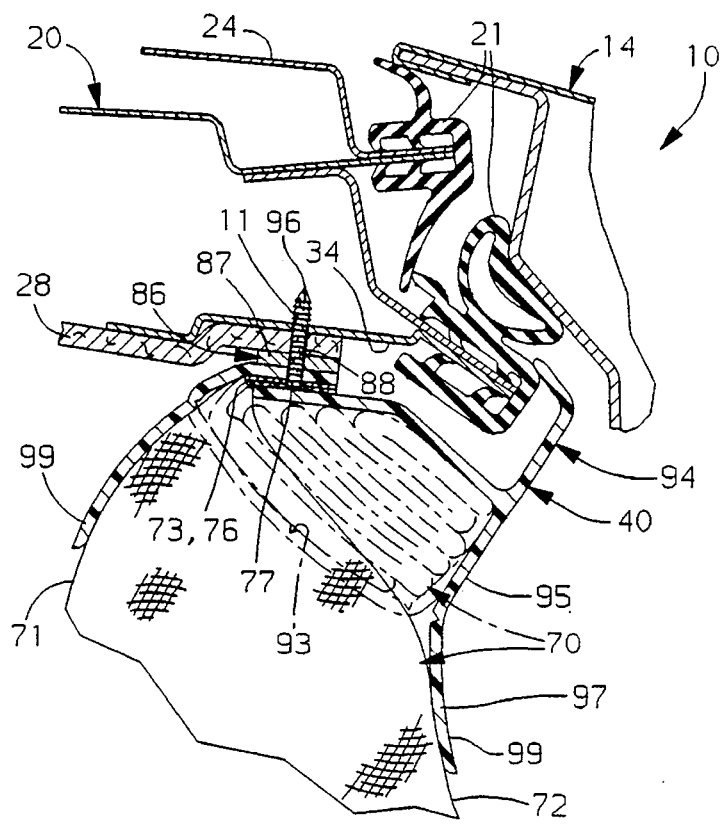
FIG. 3 is a section view taken along line 3—3 of FIG. 2.
Figure 4:
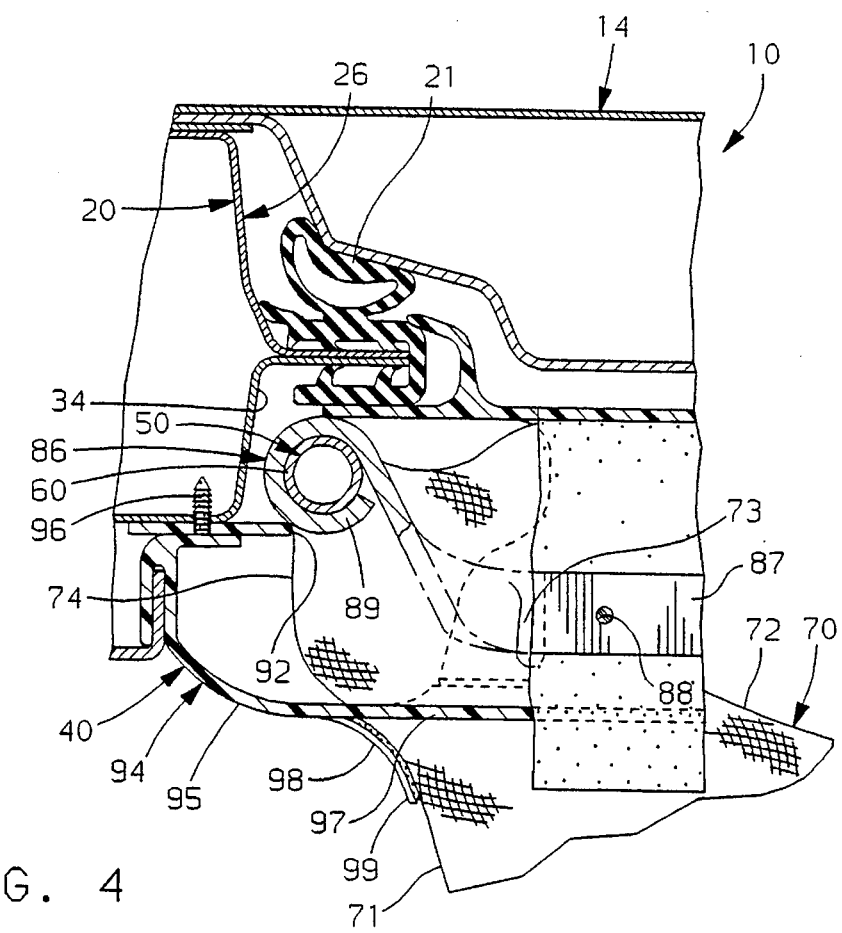
FIG. 4 is a section view taken along line 4—4 of FIG. 2.
Figure 5:
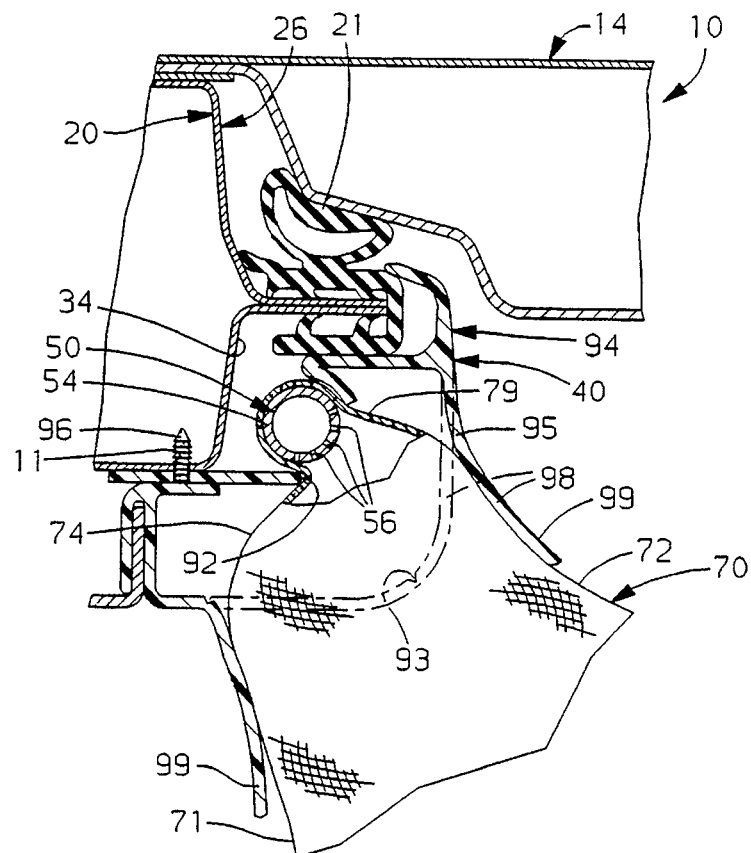
FIG. 5 is a section view taken along line 5—5 of FIG. 2.
Figure 6:
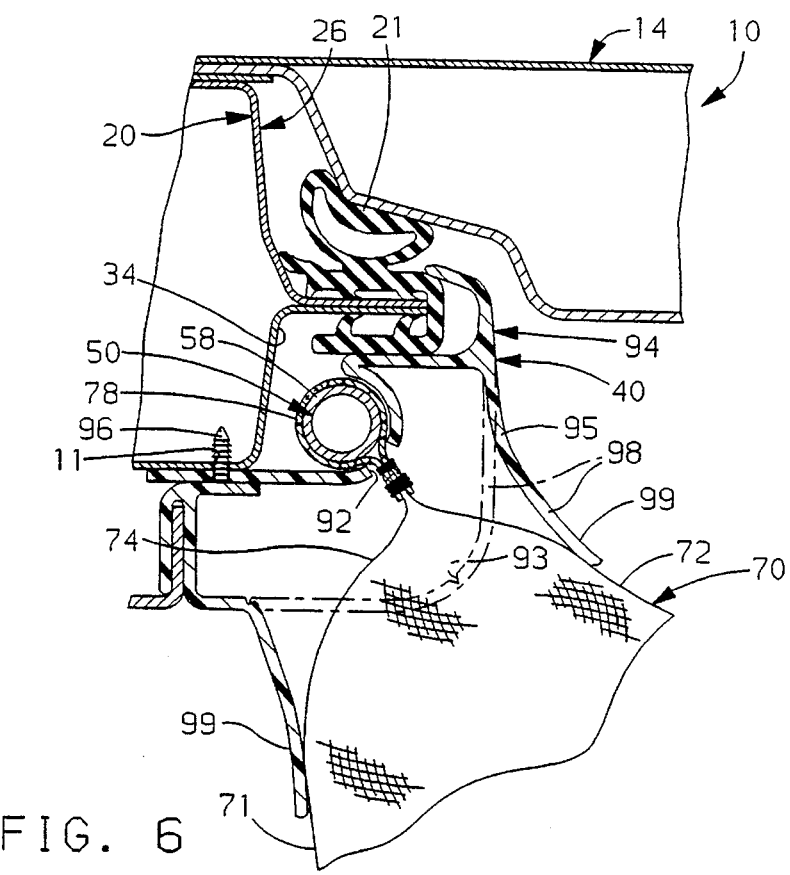
FIG. 6 is a section view taken along line 6—6 of FIG. 2.
Figure 7:
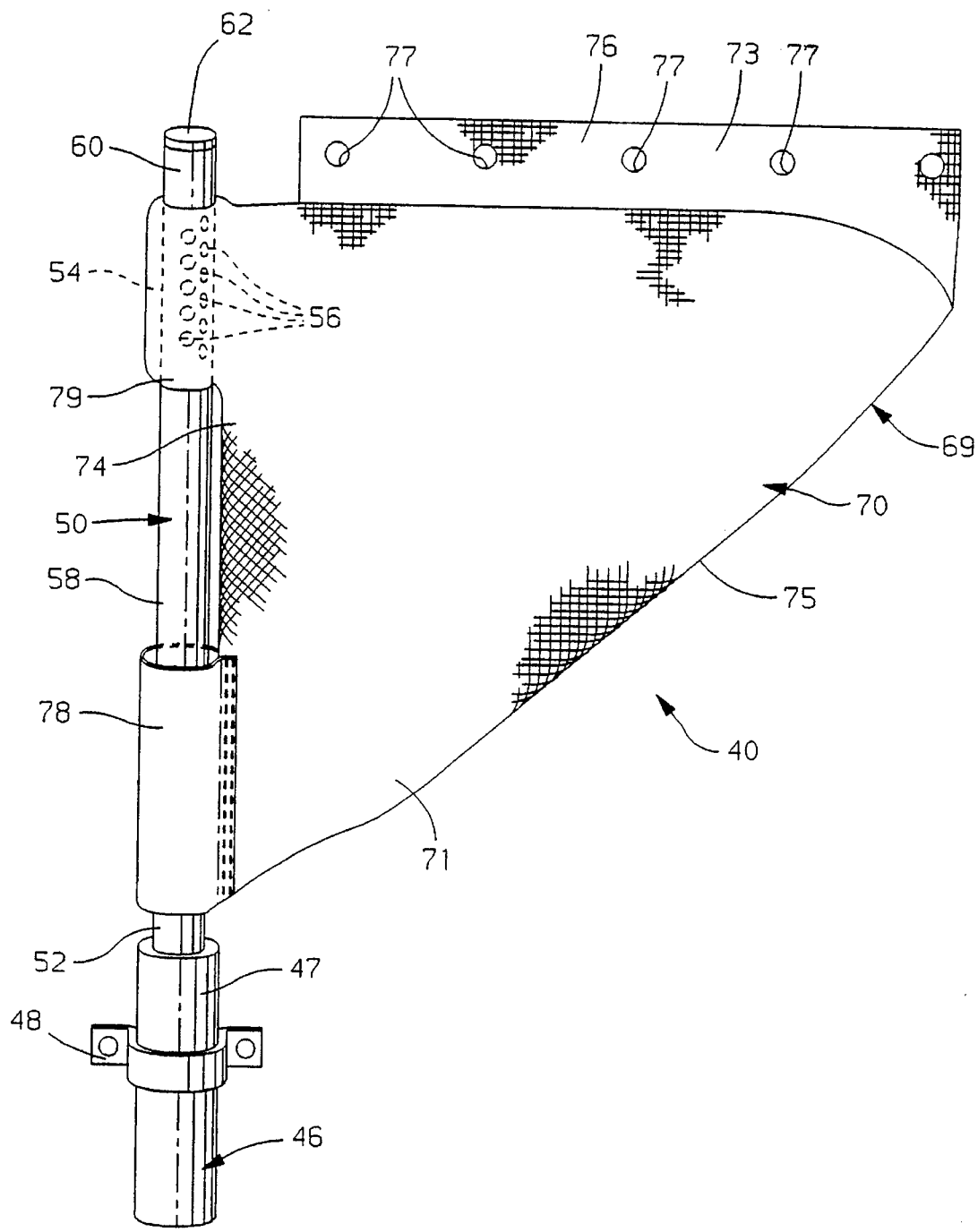
FIG. 7 is a perspective view of the air bag, an inflator, and a conduit of the air bag module.

Referring to FIGS. 1–7, the air bag 70 is preferably made of a typical fabric material which is suitable for air bag construction. The air bag 70 includes an inboard contact face 71 which is aligned to be adjacent the side of the head and upper body of a vehicle occupant (not shown) when the air bag 70 is in the inflated condition as best shown in FIGS. 2 and 7. The air bag 70 also includes an opposite outboard face 72 and an air bag periphery 69 located between the inboard and outboard faces 71, 72. The periphery 69 of the air bag 70 includes a fixed edge 73, a sliding edge 74 intersecting the fixed edge 73, and a free edge 75 extending between and the fixed edge 73 and the sliding edge 74. The generally horizontally extending fixed edge 73 is adapted to be fixedly connected to the vehicle side structure 20 at the roof rail 24. Preferably, the fixed edge 73 of the air bag 70 is in a fully extended condition when the air bag 70 is in the stored, deflated condition, as best shown in FIGS. 1, 2 and 7. The fixed edge 73 of the air bag 70 preferably includes a tether 76 having a plurality of air bag apertures 77 therein, as best shown in FIG. 7, for receiving housing fasteners 96 therethrough for attachment to the vehicle 10, as described further hereinafter. The generally vertically extending sliding edge 74 is adapted to be slidably connected to the vehicle side structure 20 at the B-pillar 26. Preferably, the sliding edge 74 of the air bag 70 includes a hem portion 78 slidably disposed around the conduit 50. The sliding edge 74 of the air bag 70 preferably is stored in a folded condition adjacent the fixed edge 73 of the air bag 70 prior to deployment. The sliding edge 74 and the fixed edge 73 of the air bag 70 are preferably substantially perpendicular to each other when the air bag 70 is in the inflated condition as shown in FIGS. 2 and 7. Preferably, the free edge 75 extends between the fixed edge 73 and the sliding edge 74 such that the inflated air bag 70 has a generally triangular shape, although numerous shapes are possible. As best shown in FIGS. 5 and 7, the sliding edge 74 of the air bag 70 preferably includes a pocket-like mouth portion 79 which is in fluid communication with the second portion 54 of the conduit 50 such that inflator gas is discharged from the second portion 54 into the air bag 70. The discharging inflator gas from the second portion 54 of the conduit 50 forces the sliding edge 74 of the air bag 70 to slide along the guide portion 58 of the conduit 50 between the second portion 54 and the first portion 52, as described further hereinafter.

The air bag module 40 preferably includes an L-shaped housing 94 formed of a molded plastic material and including a generally horizontal leg 97 and a generally vertical leg 98. Preferably, the housing 94 serves the dual purpose of housing the air bag 70 and also being the decorative interior trim piece which covers the L-shaped recess 34 in the vehicle interior 12. As best shown in FIGS. 3–6, the housing 94 has a foldable body portion 95 which is folded over and secured to itself by the plurality of integral molded-in housing fasteners 96. The housing 94 also includes a pair of cover doors 99 extending longitudinally along the legs 97, 98 of the housing 94 and having an underlying notch 93 that allows the cover doors 99 to break open during air bag 70 deployment. The housing 94 further includes an elongated slot 92 along the vertical leg 98 through which the mouth portion 79 and the hem portion 78 of the air bag 70 extend for connecting with the conduit 50.

The air bag module 40 preferably includes a horizontally extending, elongated mounting bracket 86, preferably made of metal. The bracket 86 is preferably disposed between the headliner 28 of the roof rail 24 and the horizontal leg 97 of the housing 94. As best shown in FIG. 4, the bracket 86 includes an elongated portion 87 having a plurality of bracket apertures 88 therethrough for receiving matably aligned housing fasteners 96 therethrough for attachment to the roof rail 24. The bracket 86 also includes a rearward hooked end portion 89 sized for receiving the uppermost end 60 of the conduit 50 therein for securing the conduit 50 in relation to the housing 94.

The air bag module 40 according to the present invention may advantageously be assembled as a subassembly separate from the vehicle 10 and later be transported to the vehicle assembly location for installation in the vehicle 10. The air bag module 40 is assembled as follows. The air bag 70 is folded approximately to the shape shown in FIG. 1 such that the majority of the air bag 70, including the sliding edge 74, is folded substantially adjacent the fixed edge 73 of the air bag 70. The fixed edge 73 of the air bag 70 is preferably maintained in a fully extended condition. As best shown in FIG. 3, the air bag apertures 77 on the fixed edge 73 of the air bag 70 are fixedly attached to the housing 94 by inserting the integral housing fasteners 96 through the air bag apertures 77. The air bag 70 is simultaneously secured to the housing 94 when the body portion 95 of the housing 94 is folded around and secured to itself also by the housing fasteners 96. The mouth portion 79 and the hem portion 78 of the air bag 70 are positioned to extend out through the elongated slot 92 on the housing 94 when the air bag 70 is assembled to the housing 94. The mounting bracket 86 is attached to the housing 94 by insertion of the housing fasteners 96 through the matably aligned bracket apertures 88 provided in the bracket 86. The first portion 52 of the conduit 50 is connected to the inflator 46 and the uppermost end 60 of the conduit 50 is slipped through the hooked end portion 89 of the bracket 86 to securely position the conduit 50 relative the housing 94.

In the assembled condition, it will be appreciated that the conduit 50 and inflator 46 are preferably disposed outside of the housing 94. It is often desirable to have the inflator 46 be the last component added to the air bag module 40 for safety in handling. Advantageously, the inflator 46 and conduit 50 can be kept separate from the rest of the module 40 and can later be easily assembled to the module 40, as described above, at the vehicle assembly location.

The air bag module 40 is preferably assembled within the L-shaped recess 34 of the vehicle interior 12 as follows. The inflator 46 is mounted to the vehicle side structure 20 by the inflator bracket 48 preferably at the roomier lower portion 30 of the B-pillar 26 beneath the conventional B-pillar interior trim panel 32. The conduit 50 which is connected to the inflator 46 projects up above the conventional B-pillar interior trim panel 32. The preassembled housing 94, bracket 86, and air bag 70 are easily assembled to the vehicle 10 by slipping the uppermost end 60 of the conduit 50 into the hooked end portion 89 of the bracket 86 and by snapping the integral housing fasteners 96 into matably aligned vehicle apertures 11 in the headliner 28 and roof rail 24 and also in the B-pillar 26 as shown in FIGS. 3–6. The housing 94 advantageously serves the dual purpose of housing the air bag 70 and being the decorative interior trim panel which covers the L-shaped recess 34 adjacent the vehicle side structure 20. Thus, the remainder of the air bag module 40 is aesthetically concealed from view by the housing 94.

Upon the vehicle 10 experiencing certain predetermined conditions, the inflator 46 generates inflator gas which is discharged out through the inflator 46 and into the first portion 52 of the conduit 50. The inflator gas is transferred up through the conduit 50 and out through the conduit openings 56 in the second portion 54 of the conduit 50 and directly into the mouth portion 79 of the air bag 70. The force of the inflating air bag 70 breaks open the cover doors 99 on the housing 94 and the air bag 70 is moved from the deflated condition shown in FIG. 1 to the inflated condition shown in FIG. 2. Also, the hem portion 78 on the sliding edge 74 of the air bag 70 is moved from the folded condition shown in FIG. 1 to the fully extended condition shown in FIG. 2. Advantageously, the conduit openings 56 on the second portion 54 of the conduit 50 are easily placed in an effective position for discharging inflator gas in a proper direction for forcing the sliding edge 74 of the air bag 70 along the conduit 50 away from the second portion 54 and towards the first portion 52 to the fully extended condition. Also advantageously, the periphery 69 of the air bag 70 is effectively laterally supported by engagement of the fixed edge 73 with the housing 94 and roof rail 24 and the sliding edge 74 with the B-pillar 26 such that additional reaction surfaces are not needed to laterally support the air bag 70 to prevent the occupant from pushing the air bag 70 away. However, additional reaction surfaces may be used if desired. For example, the air bag 70 could extend downwardly and use the inner door panel 16 of the vehicle door 14 as a reaction surface.

It will be appreciated that in the assembled condition, the inflator 46 is advantageously stored in the roomier lower portion 30 of the B-pillar 26 which frees the upper portion of the vehicle side structure 20 for storing the air bag 70. In the assembled condition, the fixed edge 73 of the air bag 70 is in the fully extended condition and the air bag 70 is folded substantially adjacent the fixed edge 73 of the air bag 70 such that the entire air bag 70 is folded in an extended condition. This improves packaging of the air bag 70 since the air bag 70 is spread out lengthwise and not folded into a compact bulky shape. Thus, a larger air bag 70 and inflator 46 can be mounted in the vehicle side structure 20 than in the prior art to provide side impact protection for a greater portion of the vehicle side structure 20.

It will also be appreciated that in the assembled condition the second portion 54 of the conduit 50 advantageously discharges inflator gas away from the fixed edge 73 of the air bag 70 and towards the free edge 75 and sliding edge 74 of the air bag 70, resulting in the air bag 70 being quickly deployed in a downwardly direction to cover the vehicle side structure 20. It will also be appreciated that the sliding edge 74 of the air bag 70 is oriented to slide downwardly along the conduit 50 so that gravity assists the sliding edge 74 of the air bag 70 in reaching its fully extended condition. It will further be appreciated that the conduit 50 serves the dual purpose of transferring the gas to the air bag 70 from the remotely mounted inflator 46 and also acting as the guide for the sliding edge 74 of the air bag 70. Thus, packaging efficiency of the air bag module 40 is greatly increased.

It will be understood that a person skilled in the art may make modifications to the preferred embodiment shown herein within the scope and intent of the claims. Although the preferred embodiment shows the air bag module 40 being mounted to the vehicle side structure 20, it will also be appreciated that the air bag module 40 may alternately be mounted in similarly shaped locations not shown in the vehicle 10, such as a side rear window area, a rear header and rear pillar area, or a front header and A-pillar area. It will further be appreciated that the air bag module 40 is especially well-adapted, for side impact protection of the head and upper body of the vehicle occupant, but could also be used to protect a torso of the occupant, such as by using a larger air bag that extends downwardly over the inner door panel 16. It will also be appreciated that the inflator 46 could additionally be connected to a torso air bag (not shown), such that the inflator 46 deploys both the air bag 70 and a lower torso air bag. Although the inflator 46 and conduit 50 are shown disposed outside of the housing 94, it will further be appreciated that they could be stored inside the housing 94.

Figure 8:
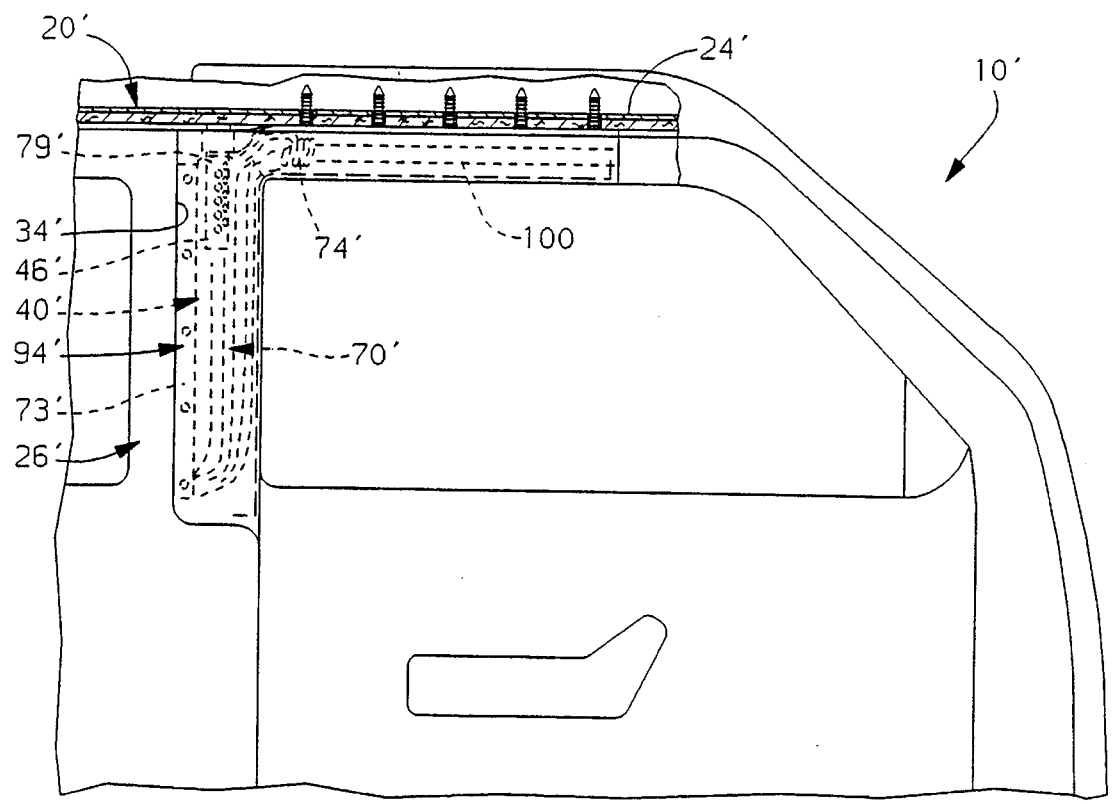
FIG. 8 is a view similar to FIG. 1, but showing an alternate embodiment of the invention.
Figure 9:
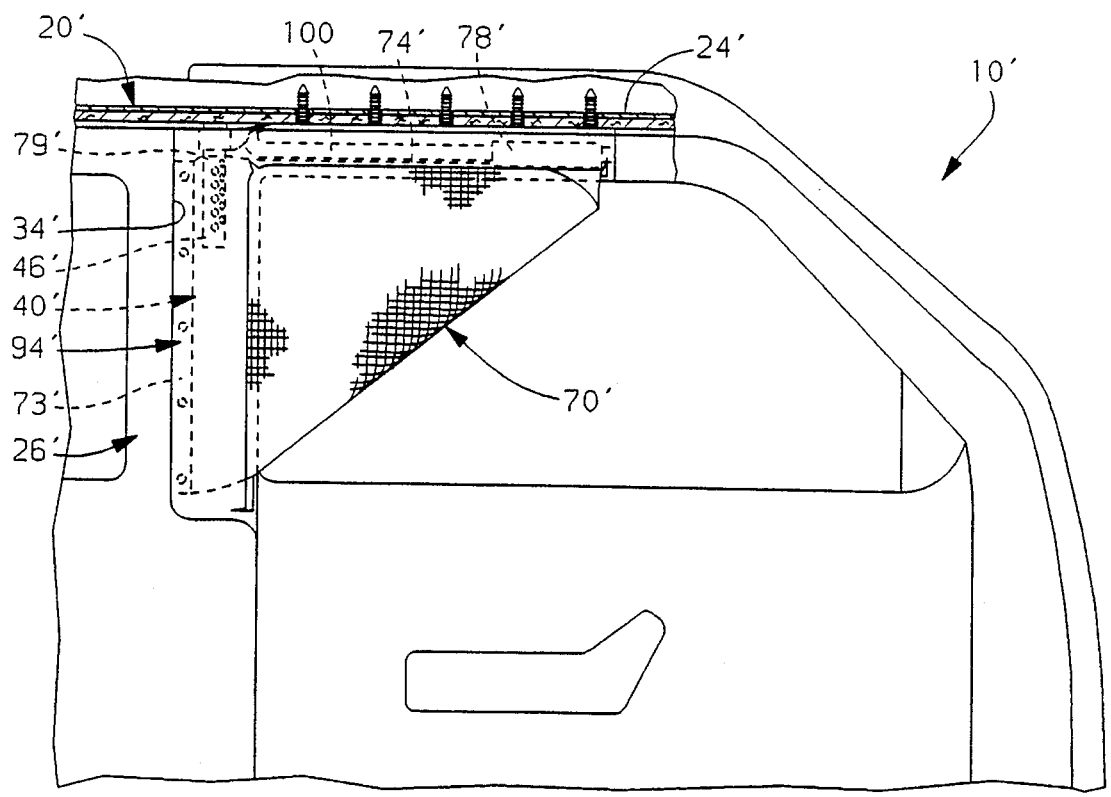
FIG. 9 is a view similar to FIG. 2, but showing the alternate embodiment of FIG. 8.

An alternate embodiment of the present invention is shown in FIGS. 8 and 9 having an air bag module 40' in which the location of a fixed edge 73' of the air bag 70' and a sliding edge 74' of the air bag 70' are exchanged from the embodiment shown in FIGS. 1—7 and the conduit 50 is replaced with a guide rod 100. Similar parts of the vehicle 10' and air bag module 40' are denoted with similar numerals for simplicity. The air bag module 40' has a deflated, undeployed condition shown in FIG. 8 in which the vertically extending fixed edge 73' of the air bag 70' is fully extended and is fixedly connected to the B-pillar 26' of the vehicle side structure 20'. The horizontally extending sliding edge 74' of the air bag 70' includes a hem portion 78' disposed around a horizontally extending guide rod 100 mounted to the roof rail 24'. The air bag 70' including sliding edge 74' is folded towards the fixed edge 73' of the air bag 70'. The deflated air bag 70' is stored in an L-shaped housing 94' which fills an L-shaped recess 34' in the vehicle side structure 20'. The housing 94' also serves as the interior trim of the vehicle side structure 20'. An inflator 46' is mounted on the upper portion of the B-pillar 26' and a mouth portion 79' of the air bag 70' is in fluid communication with the inflator 46'. Upon generation of gas by the inflator 46', the air bag 70' is inflated and breaks out through the housing 94'. The inflator 46' discharges inflator gas away from the fixed edge 73' of the air bag 70' such that the sliding edge 74' of the air bag 70' is forced to horizontally slide along the guide rod 100. Since the air bag 70' is spread out and folded substantially adjacent the fully extended fixed edge 73', the air bag module 40' is easily packaged within the L-shaped recess 34' of the vehicle side structure 20'. It will be appreciated that by using one fixed edge 73' and one sliding edge 74', the entire force of the discharging inflator gas can advantageously be directed for quickly forcing the sliding edge 74' of the air bag 70' to the extended position. Thus, the air bag 70' having a sliding edge 74' receiving the full force of the discharging inflator gas is less likely to become hung up on the guide rod 100 than if two sliding edges are utilized. It will also be appreciated that using one fully extended fixed edge 73' and one sliding side edge 74' allows the air bag 70' to be quickly deployed by the efficient directing of the inflator gas and by the partially extended condition of the air bag 70' prior to deployment.

While the present invention has been described as carded out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag module for a vehicle comprising:

an inflator for discharging inflator gas;

an air bag for inflation by the discharging inflator gas, the air bag having a sliding edge, the sliding edge of the air bag having a folded condition prior to air bag inflation and an extended condition upon air bag inflation;

a conduit having a first portion in fluid communication with the inflator for receiving discharging inflator gas therein and a second portion spaced apart from the inflator and having an opening in fluid communication with the air bag for directing discharging inflator gas into the air bag; and the sliding edge of the air bag being slidably connected to the conduit whereby upon air bag deployment, the sliding edge of the air bag slides along the conduit to the extended condition.

2. The air bag module of claim 1 wherein the sliding edge of the air bag includes a hem portion slidably disposed around the conduit.

3. An air bag module for a vehicle comprising:

an inflator for discharging inflator gas;

an elongated conduit having a first portion connected to the inflator and in fluid communication with the inflator for receiving the discharging inflator gas therein, and a second portion spaced apart from the inflator and having an opening for discharging inflator gas out through the conduit; and an air bag for inflation by the discharging inflator gas, the air bag having a sliding edge slidably connected to the conduit between the first portion and the second portion, the sliding edge being folded prior to air bag inflation and being fully extended when the air bag is inflated;

whereby upon air bag deployment, the second portion of the conduit directs the discharging inflator gas such that the sliding edge of the air bag is forced to slide along the conduit between the first portion and the second portion to the fully extended condition.

4. The air bag module of claim 3 wherein the air bag includes a fixed edge adapted to be fixedly connected to the vehicle and wherein the fixed edge of the air bag is fully extended prior to air bag inflation.

5. The air bag module of claim 4 wherein the air bag including the sliding edge is folded substantially adjacent the fixed edge of the air bag prior to air inflation.

6. The air bag module of claim 3 wherein the conduit is a hollow tube.

7. An air bag module for mounting to a side structure in a vehicle, the air bag module comprising:

an inflator adapted to be mounted on the side structure and for discharging inflator gas;

an elongated conduit having a first portion connected to the inflator and in fluid communication therewith for receiving the discharging inflator gas therein, and a second portion spaced apart from the inflator and having an opening for discharging inflator gas out through the conduit; and an elongated bracket adapted to be mounted to the side structure and extending at an angle relative the conduit; and an air bag having a deflated condition and an inflated condition and being in fluid communication with the second portion of the conduit for receiving inflator gas, the air bag having an inboard face and an opposite outboard face and a periphery between the inboard and outboard faces, the periphery of the air bag having a fixed edge fixedly connected to the bracket when the air bag is in the deflated and inflated conditions, the periphery of the air bag having a sliding edge slidably connected to the conduit, the sliding edge being folded when the air bag is in the deflated condition and being fully extended when the air bag is in the inflated condition;

whereby upon air bag deployment, the second portion of the conduit directs the discharging inflator gas such that the sliding edge of the air bag is forced to slide along the conduit to the fully extended condition.

8. The air bag module of claim 7 wherein the conduit has an end portion adjacent the second portion and wherein the end portion is connected to the bracket.

9. The air bag module of claim 7 wherein the fixed edge and the sliding edge are substantially perpendicular to each other when the air bag is in the inflated condition.

10. The air bag module of claim 7 wherein the air bag module further includes a housing for housing the air bag, the housing being attached to the bracket, and wherein the sliding edge of the air bag has a looped hem portion and the housing has an elongated slot adjacent the conduit through which the hem portion of the air bag extends for sliding attachment to the conduit.

11. The air bag module of claim 7 wherein the fixed edge of the air bag is fully extended prior to air bag inflation.

12. The air bag module of claim 7 wherein the air bag is folded substantially adjacent the fixed edge of the air bag when the air bag is in the deflated condition.

* * * * *